May 22, 1956
S. W. SINCLAIR
2,746,630
CLAMP FOR INDUSTRIAL TRUCKS
Filed Oct. 16, 1952
3 Sheets-Sheet 1
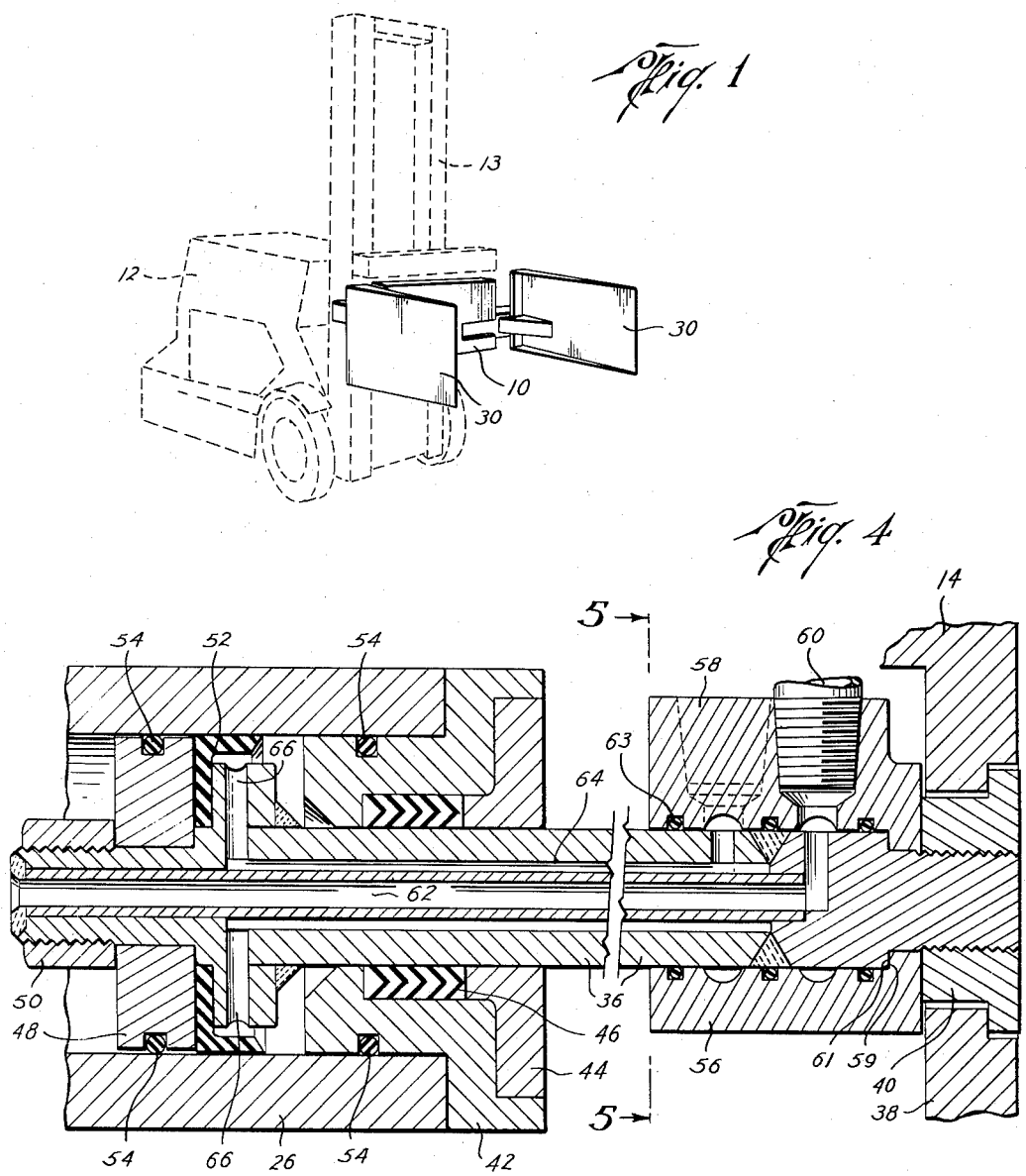
Stuart W. Sinclair
INVENTOR.
BY James F. Weiler
ATTORNEY

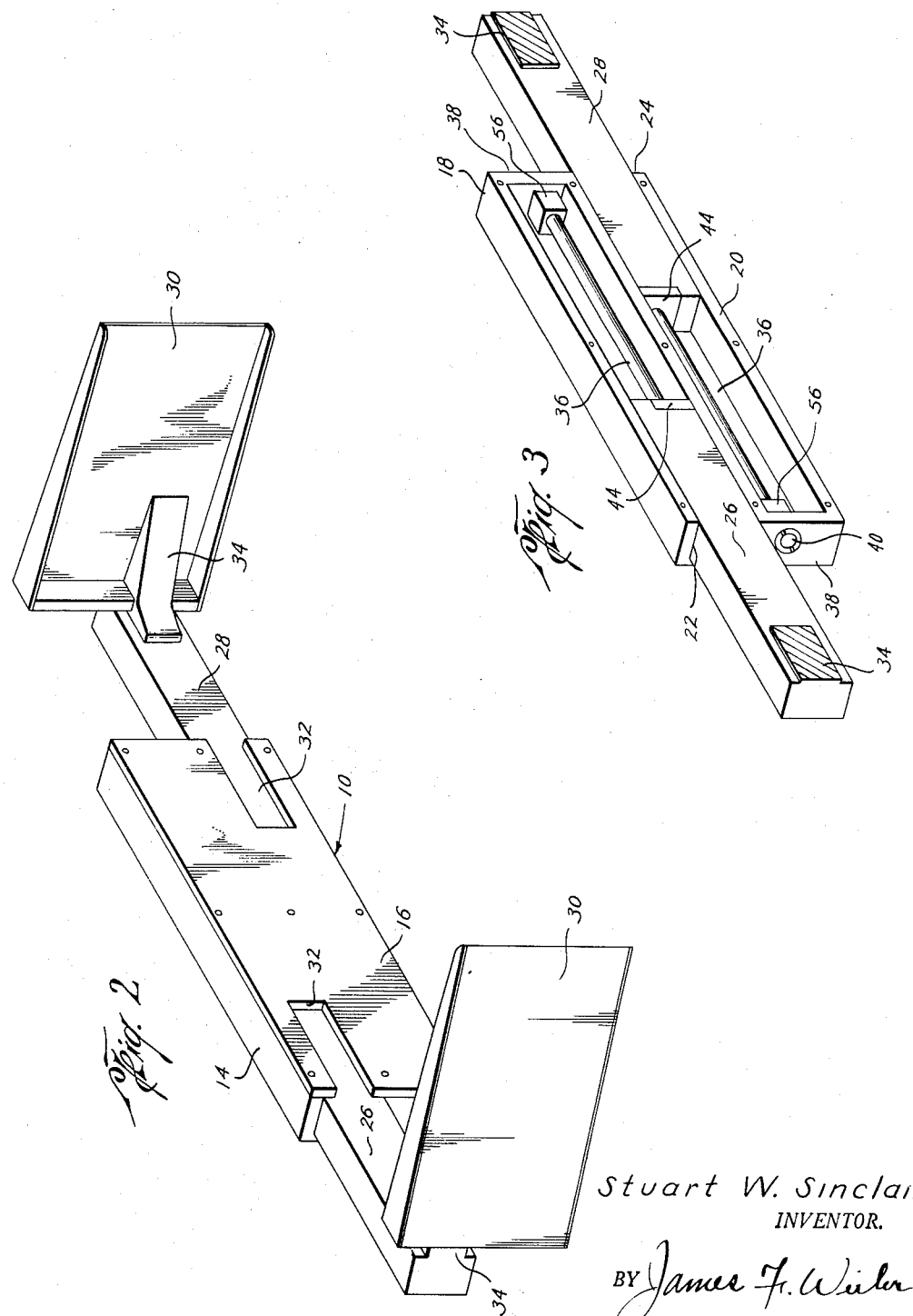

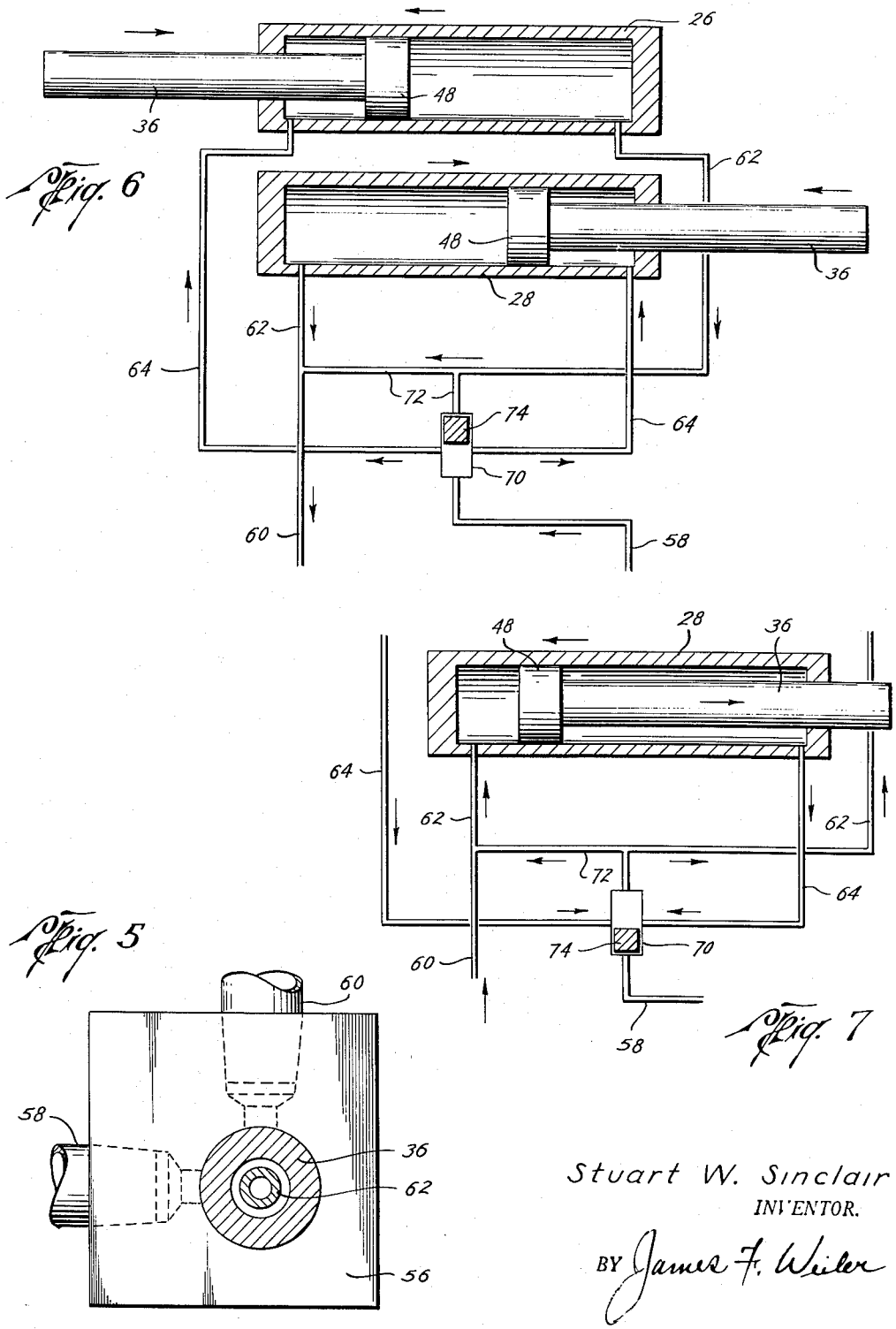

United States Patent Office 2,746,630
Patented May 22, 1956

2,746,630

CLAMP FOR INDUSTRIAL TRUCKS

Stuart W. Sinclair, Houston, Tex., assignor to Anderson, Clayton & Co., Houston, Tex., a corporation of Delaware Application October 16, 1952, Serial No. 315,057

4 Claims. (Cl. 214—653)

This invention relates to clamps for industrial trucks and more particularly relates to load engaging clamps which may be moved laterally to engage and disengage objects to be transported and moved.

Various clamps and supporting carriages have been proposed for engaging and disengaging various objects for moving various articles and among these clamps are hydraulically actuated clamps which are moved laterally to grip such objects, the clamps being secured to conventional industrial trucks. One such clamp is illustrated and shown in Patent No. 2,571,550, granted October 16, 1951, on the application of Leslie G. Ehmann.

The above and other clamps have disadvantages in that they are complicated, hence expensive to manufacture, maintain and repair. In addition such clamps have a plurality of elements in interjacent relationship, that is, one over the other, which necessitates the use of a relatively deep carriage which limits its range of use, such as loading or unloading articles to and from confined spaces.

It is therefore an object of the present invention to provide a clamp which may be moved laterally to engage and disengage various objects and which constitutes a simplification of parts of the clamps or auxiliary equipment used for gripping objects presently used in or known to the industry.

It is a further object of the present invention to provide a clamp which is durable and rugged in use, which is easily repaired and maintained and which is less expensive to manufacture and maintain than clamps presently being used or known to the art.

It is yet a further object of the present invention to provide a clamping mechanism which may be secured to industrial trucks which is flexible in use in operation and which may readily be extended to grip relatively large objects and retracted to securely grip relatively small articles.

A still further object of the present invention is the provision of a load supporting carriage which is of relatively less depth than present ones used for similar purposes and which permits loading and unloading in confined areas.

A still further object of the present invention is the provision of a load supporting carriage, the hydraulic system of which has means to provide relatively fast opening and slow closing of the gripping or load supporting means.

A still further object of this present invention is the provision of a load supporting carriage which opens more rapidly by compounding the backflow from the piston and cylinder assemblies with the input.

Other and further objects will be apparent from a description of the invention given for the purpose of disclosure. The present invention is particularly suitable for use in connection with gripping and moving bales of cotton and the example of the invention given for the purpose of disclosure is designed for that particular use. It will be understood, however, that the clamping mechanism of the present invention may be used to grip almost any kind of load and may be used for widely varying uses.

The following description is given in connection with the accompanying drawings, where like reference numerals designate like parts throughout the several views, and where:

Fig. 1 is a diagrammatic illustration of a clamp mechanism constructed in accordance with the present invention shown secured to a conventional industrial truck, Fig. 2 is a perspective view of the clamp mechanism illustrated in Fig. 1 and shown in an expanded position, Fig. 3 is a fragmentary view, with parts broken away, similar to Fig. 2 and better illustrates details of the clamping mechanism, Fig. 4 is a fragmentary cross-section illustrating a means of supplying hydraulic fluid for actuating the clamping mechanism, Fig. 5 is a cross-section taken along the line 5—5 of Fig. 4, and Figs. 6 and 7 are flow diagrams illustrating automatic means for providing a quick opening and relatively slow closing of clamping mechanisms, Fig. 7 being a fragmentary view.

Referring now to the drawings, and particularly to Fig. 1, a clamp or load supporting carriage constructed in accordance with the present invention is indicated by the reference numeral 10, and shown as being connected to a conventional industrial truck 12. The truck 12 may be of any desired type, and constitutes no part of the present invention; hence no detailed description thereof is deemed necessary. In order that the clamping mechanism of the present invention may be actuated hydraulically, however, it is necessary that the truck 12 have the usual hydraulic connections and the like, and customarily it will have the upright standards 13 to which the clamp 10 may be connected in the usual manner.

Referring now to the load engaging clamp of the present invention, and particularly to Figs. 2–4, inclusive, the clamping mechanism 10 is adapted to be secured upon the upright track 13 (see Fig. 1) at the back of the body portion or carriage 14. A front plate 16 is provided and the clamp comprises a pair of guides 18 and 20 mounted one above the other and open at their opposite ends 22 and 24, respectively. Slidably disposed in the guides 18 and 20 are two oppositely directed piston cylinders 26 and 28, respectively, which have the load clamping members 30 secured at their free extremities. It will be understood that any type load clamping or supporting members may be used instead of the members 30 illustrated.

By the arrangement illustrated, it is noted that the piston cylinders 26 and 28 serve as slides slidable in the guides 18 and 20 thereby eliminating the necessity of additional guides and slides. Preferably, the guide and slide surfaces are multisided, when viewed in cross-section, and their guide and slide surfaces should be complementary.

The load engaging arms 30 are secured in spaced relation with respect to the piston cylinders 26 and 28 by means of the forwardly extending arms 34 which may be welded or otherwise secured to the clamping members 30. It is desirable in gripping small objects, such as a single bale of cotton, to be able to move the load engaging arms 30 together within the limits of the carriage 14, and, for this purpose, the slots 32 have been provided in the front plate 16 to permit movement therein of the forwardly extending arms 34.

Any conventional piston and cylinder arrangement which may be connected to conventional hydraulic controls on a lift truck may be used; however, the arrangement illustrated in Fig. 4 is satisfactory. While only a single piston and cylinder arrangement is illustrated in Fig. 4, it will be understood that the arrangement is illustrative of both piston and cylinder arrangements.

Referring now to Figs. 4 and 5, the piston rod 36 is secured to an end 38 of the carriage 14 by any conventional means, such as by threading an end of the piston rod 36 to the nut 40 disposed therein. Slidably disposed about the piston rod 36 is the piston head 42 which is secured to the piston cylinder 26. Any suitable packing means may be provided to prevent leakage of fluid between the head 42 and the piston rod 36, and, as here shown, the gland 44 and chevron packing 46 are satisfactory. The packing may be of any suitable material, such as rubber, neoprene and the like.

A piston 48 is secured to the free extremity of the piston rod 36, and may be secured thereto in any desired manner. Here, the piston 48 is illustrated as being secured to the piston rod 36 by means of threading the bolt 50 on the end of the piston rod 36. Suitable packing is provided to prevent leakage of hydraulic fluid past the piston 48 and, the cup-like sealing member 52, formed of any suitable material, such as rubber, neoprene and the like may be used. As indicated, both the cylinder head and piston may be suitably packed, in addition to the packing heretofore indicated, such as by the O-rings 54.

Disposed about the end of the piston rod 36 proximate the guide end member 38 is a connecting member 56 for providing convenient connection to the hydraulic system of the truck. This may be accomplished by sliding the connecting member 56 over the end of the piston rod 36 until the collar 59 of the connecting member 56 engages the shoulder 61 on the piston rod 36. As illustrated, suitable packing, such as the O-rings 63 may be provided to prevent leakage of hydraulic fluid.

Suitable hydraulic fluid inlets and outlets 58 and 60 are provided in the hydraulic connecting member 56 for connection to the hydraulic system of the industrial truck 12. As illustrated, these connections may be threaded or may be any desired type connection. Communicating with the inlet and outlet 60 is the fluid duct 62 for providing inlet and back flow of hydraulic fluid on the outer side of the piston 48, and communicating with the inlet and outlet 58 is the fluid duct 64, here shown as concentric with the fluid duct 62, which communicates with the radially extending fluid duct 66 to provide hydraulic fluid to and back flow thereof from the inside of the piston 48. Thus, by manipulating conventional controls (not shown) on the industrial truck, the piston cylinders may be made to move outwardly or inwardly as desired.

While a detailed description of the presently preferred form of the invention has been illustrated in connection with the piston cylinder 26, it is understood that the same arrangement may be utilized in connection with the piston cylinder 28.

In operation, the clamping members 30 may be extended or retracted to engage or disengage objects of varying size, and elevated and moved by the truck. It seems obvious that the guides 18 and 20, which form the body for the clamping mechanism, permit the piston cylinders 26 and 28 to slide therein, the cylinders thus serving the purpose as slides. The manipulation of conventional hydraulic controls (not shown) on the truck, provides movement in either direction depending upon which side of the piston 48 hydraulic fluid is introduced.

It is highly desirable and advantageous in clamping mechanisms to provide a quick opening or idling stroke with respect to the closing or clamping stroke. This provides much faster operations and, yet at the same time, provides dependable and reliable gripping or clamping of the object desired to be clamped and moved or transported.

Referring now to Figs. 6 and 7 of the drawing, a means has been provided whereby the opening or idling stroke will be made rapidly with respect to the closing or clamping stroke. In order to provide an automatic fast opening with respect to the closing, a regulator valve 70 is connected to the power leads 58 and 60, the latter by means of the communicating conduit 72. The conduit 72 is secured on the opposite side of the regulator valve 70 with respect to the lead 58 and, disposed in the regulator valve 70 is a valve element or piston 74 which is so constructed and arranged that when hydraulic fluid is flowing into the regulator valve 70 in line 58, such fluid will be free to flow in the connecting line 64, but not in the line 72 which connects with the lines 62 in which there is a back flow of hydraulic fluid; however, when hydraulic fluid is flowing into the system by means of the lead 60, such fluid will flow into the regulator valve 70 in lines 72 thereby automatically moving the valve or piston element 74 to the position shown in Fig. 7, and thereby preventing backflow of fluid in the fluid conduit 64 from flowing out the conduit 58. Thus, the backflow in lines 64 will be added to the hydraulic fluid flowing into the lines 60 and 62 and thereby increasing the movement of the cylinder 28 in the direction illustrated in Fig. 7.

It seems apparent that there will be a pressure differential on the side of the piston to which the piston rod is not connected favorable to this movement, that is, to relatively fast opening. The relative closing and opening force, as well as the relative closing and opening speed may be expressed mathematically as follows:

Maximum closing force = (area of the cylinder bore − area of the piston rod) × the pump pressure Maximum opening force = [area of the piston bore − area of the piston bore − (area of the piston, rod end)] × pump pressure = the area of the piston rod × pump pressure.

$$\text{Maximum speed of closing} = \frac{\text{pump output (cubic inches/minute)}}{\text{area of cylinder bore-area of the piston rod (sq. in.)}}$$

$$\text{Maximum speed of opening} = \frac{\text{pump output (cubic inches/minute)}}{\text{area of piston rod (square inches)}}$$

In the above formulae all areas given are cross sectional areas.

From the above mathematical expressions, it seems apparent that there is a pressure differential on opposite sides of the piston favorable to permit relatively rapid outward movement, and relatively slow inward or clamping movement of the clamping or load engaging arms.

Thus, in operation, on the open stroke, hydraulic fluid will flow into the cylinders by means of the lines 60 which moves the valve element 74 to the position illustrated in Fig. 7, in which event the backflow from the cylinders will be added to the fluid flowing into the system in the lead 60 to the input line 62. When retracting or moving the clamps into a clamping position hydraulic fluid will flow into the system in line 58, which will move the valve element 74 in the regulator valve 70 to the position illustrated in Fig. 6, thereby permitting backflow from the cylinders to drain therefrom by means of the lines 62.

It seems obvious, if desired, that the automatic means for opening the clamping arms fast with respect to the closing thereof, may be reversed in that the cylinders may be held stationary and the pistons and piston rods made to move.

Numerous changes in details and rearrangement of parts may be made. It seems apparent that the clamping device of the present invention is well adapted to obtain the objects set forth herein and others inherent therein.

It is therefore desired to be limited only by the spirit

What is claimed is:

1. A load engaging clamp for an industrial truck comprising, a lift carriage, a pair of parallel guides disposed on said lift carriage, a piston cylinder slidably and nonrotatably disposed in each guide, the outer surface of said piston cylinder defining a slide surface complementary with the surfaces of the guides, such cylinders being oppositely directed, a piston element in each cylinder, a piston rod secured to each piston element and secured at its opposite end to said lift carriage, and a load engaging arm secured to the free extremity of such piston cylinder whereby the slide surfaces and the guides support the weight of a load on the load engaging arms.

2. A clamp for an industrial truck comprising, a lift carriage, a pair of parallel load bearing guides disposed on said lift carriage, a piston cylinder slidably and nonrotatably disposed in each guide, the outer surface of said piston cylinder defining a slide surface complementary with the surfaces of the guides, such cylinders being oppositely directed, a piston element in each cylinder, a piston rod secured to each piston element and secured at its opposite end to said lift carriage, a load engaging arm secured to the free extremity of each such piston cylinder, and means for controlling fluid to each piston cylinder.

3. A load supporting carriage for an industrial truck comprising, a lift carriage, parallel guides, a slide slidably disposed in each guide, each slide including piston and cylinder elements, load engaging means on the free extremity of each said slide, hydraulic means for actuating said slides, such hydraulic means including first and second lines establishing fluid communication with the piston and piston rod sides of said piston and cylinder elements, respectively, an automatic regulator valve having an extended main passage, the first line being connected to the main passage at substantially its mid-portion, an input line connected to the main passage substantially at one end, a branch line connected to said main passage adjacent the other end, and a valve element slidably disposed in the main passage, such valve element being of an extent less than one-half of that of the main passage whereby inflow of fluid in the input line positions said valve element in said other end thereby permitting inflow of fluid in the first line and preventing backflow of fluid in said second and branch lines from entering said main passage and said first line, and whereby inflow of fluid in said second and branch lines moves said valve element to said one end thereby permitting inflow of fluid in said second line and backflow of fluid in said first line through said main passage into said second line and preventing outflow in said input line of said backflow in said first line.

4. In a hydraulic system including a pair of movable load engaging arms to be moved by liquid under pressure of such system and by relaxation of such pressure and having first and second lines establishing fluid communications with piston and piston rod sides, respectively, of a piston and cylinder assembly, an automatic regulator valve having a main passage, the first line being connected to the main passage at substantially its mid-portion, an input line connected to the main passage substantially at one end, a branch line connected to said second line and connected to the main passage adjacent its other end, and a valve element slidably disposed in the main passage, said valve element having an extent less than one-half of that of the main passage whereby inflow of fluid in the input line positions said valve element in said other end thereby permitting inflow of fluid in the first line and preventing backflow of fluid in said second and branch line from entering said main passage and said first line, and whereby inflow of fluid in said second and branch lines positions said valve element in said one end thereby permitting inflow of fluid in said second line and backflow of fluid in said first line through said main passage and into said second line while preventing outflow of said backflow in said first line through said input line.

References Cited in the file of this patent

UNITED STATES PATENTS

| | | |
|---|---|---|
| 2,267,284 | Livers | Dec. 23, 1941 |
| 2,571,550 | Ehmann | Oct. 16, 1951 |
| 2,587,893 | Pridy et al. | Mar. 4, 1952 |
| 2,595,131 | Ehmann | Apr. 29, 1952 |
| 2,609,114 | Backofen et al. | Sept. 2, 1952 |
| 2,613,830 | Ponnequin | Oct. 14, 1952 |
| 2,628,731 | Reuter | Feb. 17, 1953 |